G. O. A. LILLEGORD.
COVER FOR COOKING VESSELS.
APPLICATION FILED MAR. 13, 1911.
999,376.
Patented Aug. 1, 1911.
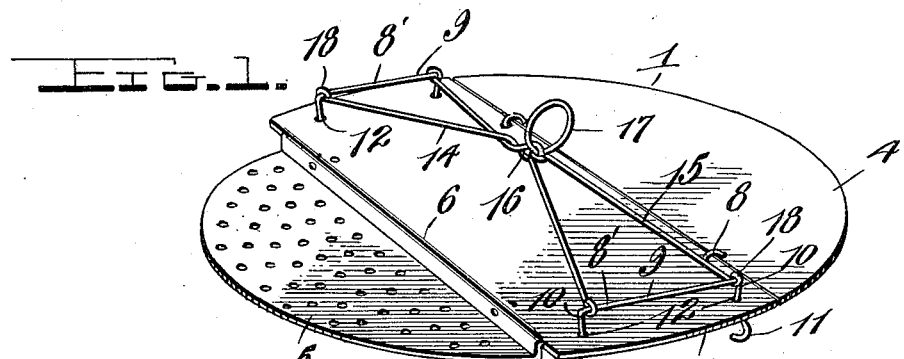
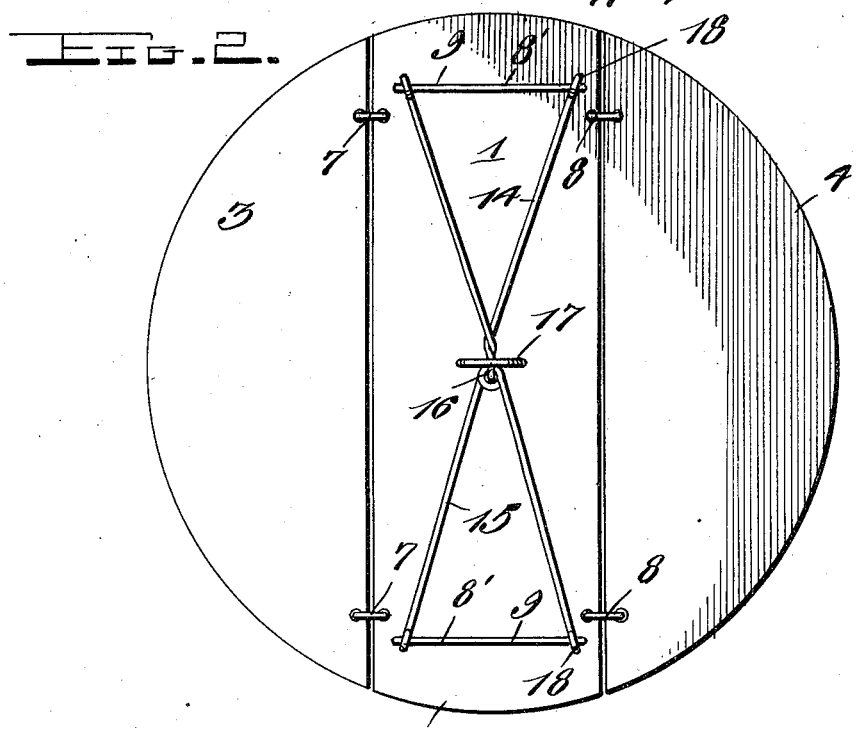
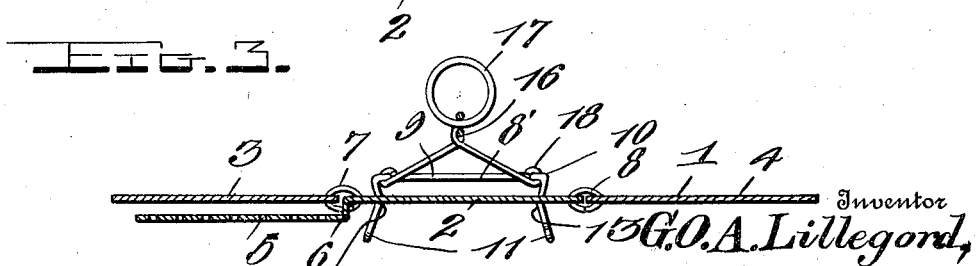
Witnesses
Chas. L. Griesbauer.
H. E. Coleman.
Inventor
G. O. A. Lillegord,
By Watson E. Coleman.
Attorney
COLUMBIA PLANOGRAPH CO., WASHINGTON, D. C.

UNITED STATES PATENT OFFICE.

GRETHE O. A. LILLEGORD, OF ROUND LAKE, MINNESOTA.

COVER FOR COOKING VESSELS.

999,376.  Specification of Letters Patent.  Patented Aug. 1, 1911.

Application filed March 13, 1911. Serial No. 614,055.

*To all whom it may concern:*

Be it known that I, GRETHE O. A. LILLEGORD, a citizen of the United States, residing at Round Lake, in the county of Nobles and State of Minnesota, have invented certain new and useful Improvements in Covers for Cooking Vessels, of which the following is a specification, reference being had to the accompanying drawings.

My invention relates to improvements in covers for cooking pots and vessels; and has for its primary object to provide an improved appliance for firmly locking the cover in place on the vessel to which it may be applied, such fastening appliance being readily engaged with the vessel and easily manipulated without the hands touching the vessel or the cover to release the fastener from the vessel and permit the removal of the cover.

Another object is to provide an improved cover adapted to permit liquid to be drained from the vessel without escape of the solid matter or food contained therein, and the ports by which the draining of the liquid is effected may be readily closed to retain steam within the vessel for the purpose of expeditiously cooking the food.

A further object of the invention is to produce a cover of this character which possesses advantages in points of efficiency, durability, is inexpensive, of manufacture and at the same time simple in construction and operation.

With the foregoing and other objects in view the invention consists in the novel features of construction and arrangement of parts hereinafter described, pointed out in the claims and shown in the accompanying drawings in which—

Figure 1 is a perspective view of my improved cover having one section removed; Fig. 2 is a top plan view; and Fig. 3 is a horizontal sectional view.

Referring more particularly to the drawings 1 indicates a cover substantially of disk form of a diameter proper to fit upon the edge of an ordinary cooking pot or vessel, and is stamped from sheet metal or other suitable material. It is preferred to have this cover 1 made in three sections as indicated at 2, 3 and 4, the section 2 being the body or main section to which are hinged the outside sections 3 and 4. Formed integral with this central or main section 2 is a strainer portion 5 bent twice at right angles as shown at 6 so that it will come somewhat below the main section and will be disposed on the inside of the vessel and come just below the top edge thereof.

The section 3 is hinged to the central section at 7 and disposed over the strainer portion 5 so that no steam can escape during the boiling period and if it is desired to strain the liquid from solid matter in the vessel the section 3 is swung back on its hinges 7 and the liquid run off through the strainer 5.

The section 4 is hinged to the central section 2 by means of the hinges 8 so that it may be raised or thrown back to examine the contents during the boiling period without removing the cover from the vessel.

The cover 1 is held onto the vessel by novel means mounted on the back thereof, said means comprising two members 8' bent from a single length of wire to form the cross bars 9, having the arms 10 bent at right angles to the cross bars and having their opposite free ends bent to form the catch hooks 11. The arms 10 are disposed through the openings 12 in the cover and are bent to a slight angle at 13 so they will readily engage and disengage onto the edge of the vessel. These members 8' are connected at a central point by means of the bails 14 and 15 which are bent from a single length of wire and are looped intermediate of their ends and secured together at 16 and a ring or finger piece 17 mounted in the loop 16. The free ends of the bails are bent upon the bars 9 at each opposite side as shown at 18 to form a pivot or hinge. Thus it will be obvious that any pull or strain upwardly on the finger piece 17 will tend to disengage the hooks 11 from the edge of the vessel allowing the cover to be removed. And when the cover is replaced the hooks will be brought into engagement with the edge of the kettle by pushing down on the bails 14 and 15.

While I have shown and described the preferred construction of my invention I do not want to limit myself thereto but desire to make such changes as fairly fall within the scope thereof.

It will be obvious that various changes in the details of construction and in the proportions may be resorted to for successfully carrying the invention into practice without sacrificing any of the novel features or departing from the scope thereof.

What is claimed is:

1. In a device of the character described, the combination of a sectional cover substantially of disk form, said cover composed of three sections, a central section having a strainer portion formed integral therewith, said strainer portion being bent twice at right angles so as to come below the edge and disposed on the inside of the vessel, an outside section hinged to the central section and disposed over said strainer portion, and a second outside section hinged to the central section opposite the first mentioned outside section.

2. In a device of the character described, the combination of a receptacle cover substantially of disk form, means mounted on said cover for securing the same to a receptacle, said means comprising bars arranged at opposite sides of said cover and having arms disposed through openings in said cover, hooks formed on said arms, bails connecting said bars at a central point, said bails being looped intermediate of their ends and looped together, a ring or finger piece secured at the central loop and the free ends of said bails being pivotally connected to the cross bars at each opposite side thereof.

3. In a device of the character described, the combination of a cover substantially of disk form, means mounted on said cover for securing the same to a receptacle, said means comprising clutching means disposed through openings at each opposite side of said cover, said means being centrally connected by cross bails, said cross bails being looped together intermediate of their ends, a finger piece secured in said loop adapted to operate the clutching means, said clutching means comprising cross bars having arms bent at right angles, said arms having their ends bent to form hooks, and said arms being disposed through openings in said cover and bent at an angle so that the hooks will be readily engaged and disengaged from the edges of the receptacle.

In testimony whereof I hereunto affix my signature in the presence of two witnesses.

GRETHE O. A. LILLEGORD.

Witnesses:
 A. L. GETMAN,
 B. C. DENKMANN.

---

Copies of this patent may be obtained for five cents each, by addressing the "Commissioner of Patents, Washington, D. C."